(12) United States Patent
Tico et al.

(10) Patent No.: US 11,562,470 B2
(45) Date of Patent: Jan. 24, 2023

(54) UNIFIED BRACKETING APPROACH FOR IMAGING

(71) Applicant: Apple Inc., Cupertino, CA (US)

(72) Inventors: Marius Tico, Mountain View, CA (US); Alok Deshpande, Mountain View, CA (US); Anita Nariani Schulze, Los Altos, CA (US); Hao Sun, San Jose, CA (US); Jun Hu, Sunnyvale, CA (US); Justin Michael Faryabi-Allen, San Francisco, CA (US); Morten Poulsen, Palo Alto, CA (US); Tak Shing Wong, Pleasanton, CA (US); Wu Cheng, Millbrae, CA (US)

(73) Assignee: Apple Inc, Cupertino, CA (US)

( * ) Notice: Subject to any disclaimer, the term of this patent is extended or adjusted under 35 U.S.C. 154(b) by 107 days.

(21) Appl. No.: 17/224,830

(22) Filed: Apr. 7, 2021

(65) Prior Publication Data

US 2021/0256669 A1 Aug. 19, 2021

Related U.S. Application Data

(63) Continuation of application No. 16/426,448, filed on May 30, 2019, now Pat. No. 10,977,778.
(Continued)

(51) Int. Cl.
  *G06T 5/00* (2006.01)
  *H04N 5/235* (2006.01)
  *G06V 10/40* (2022.01)

(52) U.S. Cl.
  CPC .............. *G06T 5/009* (2013.01); *G06V 10/40* (2022.01); *H04N 5/2356* (2013.01);
(Continued)

(58) Field of Classification Search
  CPC ....... G06T 5/009; G06V 10/40; H04B 5/2356
  See application file for complete search history.

(56) References Cited

U.S. PATENT DOCUMENTS 8,570,396 B2 10/2013 Rapaport
8,896,625 B2 11/2014 Chen
(Continued)

FOREIGN PATENT DOCUMENTS

CN 105376473 A 3/2016
CN 106060406 A 10/2016
(Continued)

*Primary Examiner* — Edward Park
(74) *Attorney, Agent, or Firm* — Blank Rome LLP

(57) ABSTRACT

Devices, methods, and computer-readable media are disclosed describing an adaptive approach for image bracket selection and fusion, e.g., to generate low noise and high dynamic range (HDR) images in a wide variety of capturing conditions. An incoming image stream may be obtained from an image capture device, wherein the incoming image stream comprises a variety of differently-exposed captures, e.g., EV0 images, EV− images, EV+ images, long exposure (or synthetic long exposure) images, EV0/EV− image pairs, etc., which are received according to a particular pattern. When a capture request is received, a set of rules and/or a decision tree may be used to evaluate one or more capture conditions associated with the images from the incoming image stream and determine which two or more images to select for a fusion operation. A noise reduction process may optionally be performed on the selected images before (or after) the registration and fusion operations.

20 Claims, 6 Drawing Sheets

Related U.S. Application Data

(60) Provisional application No. 62/679,708, filed on Jun. 1, 2018.

(52) U.S. Cl.
CPC ............. *G06T 2207/10144* (2013.01); *G06T 2207/20208* (2013.01); *G06T 2207/20221* (2013.01)

(56) References Cited

U.S. PATENT DOCUMENTS

| | | |
|---|---|---|
| 9,344,638 B2 | 5/2016 | Zhang |
| 9,407,831 B2 | 8/2016 | Wong |
| 9,723,200 B2 | 8/2017 | Kanumuri |
| 2009/0091645 A1 | 4/2009 | Trimeche |
| 2009/0103630 A1* | 4/2009 | Fuchikami ............. H04N 5/772 |
| | | 348/E5.031 |
| 2010/0194963 A1 | 8/2010 | Terashima |
| 2011/0058065 A1 | 3/2011 | Kiuchi |
| 2014/0267883 A1 | 9/2014 | Vidal-Naquet |
| 2014/0313369 A1* | 10/2014 | Kageyama ............... H04N 9/77 |
| | | 348/223.1 |
| 2018/0224545 A1 | 8/2018 | Price |
| 2019/0342485 A1 | 11/2019 | Lee |
| 2022/0230341 A1* | 7/2022 | Rahnama ............. H04N 13/128 |

FOREIGN PATENT DOCUMENTS

| | | |
|---|---|---|
| CN | 106060446 A | 10/2016 |
| JP | 2013515442 A | 5/2013 |

\* cited by examiner

UNIFIED BRACKETING APPROACH FOR IMAGING

TECHNICAL FIELD

This disclosure relates generally to the field of digital image processing. More particularly, but not by way of limitation, it relates to techniques for an adaptive approach to image bracket selection and fusion, in order to generate low noise and high dynamic range (HDR) images in a wide variety of capturing conditions.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being captured in a streaming fashion), a device condition measurement (such as an image captured with the least amount of device rotation), or any other image condition or set of conditions desired by a given implementation.

A "distance measure" may then be used to determine if the pixels in the candidate images are sufficiently similar to the corresponding pixel in the reference image to be fused. If the distance measure between a given candidate pixel in a candidate image and the corresponding pixel in the reference image is below a distance threshold, e.g., a noise-dependent distance threshold, the candidate pixel is deemed similar, and it may be used to contribute to the fused result for that pixel.

Often, there can be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image, but has different colors in the other candidate images will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image. Thus, in some embodiments, avoiding ghosting artifacts may be desirable when fusing multiple image frames for the purpose of noise reduction.

Despite these potential difficulties, in general, by fusing multiple images together, a better quality resultant image may be achieved than may be obtained from a single image capture. The multiple image captures used in a given fusion operation may comprise: multiple images captured with the same exposure (e.g., for the purposes of freezing motion), which will be referred to herein as Still Image Stabilization (SIS); multiple images captured with different exposures (e.g., for the purposes of highlight recovery, as in the case of High Dynamic Range (HDR) imaging); or a combination of multiple images captured with shorter and longer exposures, as may be captured when an image capture device's Optical Image Stabilization (OIS) system is engaged, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

Thus, what is needed is an approach to adaptively fuse bracketed captures of arbitrary exposures, such that the fused result is optimal, e.g., in a statistical sense, for a given set of capturing conditions.

SUMMARY

Devices, methods, and computer-readable media are disclosed herein that take an adaptive approach for image bracket selection and fusion, in order to generate low noise and high dynamic range images in a wide variety of capturing conditions. More particularly, an incoming image stream may be obtained from an image capture device, wherein the incoming image stream comprises a variety of different bracketed image captures, which are, e.g., received in a particular sequence and/or according to a particular pattern. When a capture request is received, the method may then select two or more images from the incoming image stream for fusion, based on an evaluation of one or more capture conditions.

According to some embodiments, the capture conditions may comprise one or more device capture conditions, e.g.: whether the images were captured using a "secondary frame pair" (SFP) capture mode (as will be discussed in further detail below); whether an OIS mode of the image captured device has been engaged; whether an HDR mode of the image capture device has been engaged; whether flicker has been detected in one or more of the incoming captured images; positional or orientation data related to the image capture device during the capture of the relevant parts of the incoming image stream; the type or number of cameras used in the capture; whether it is permissible to disrupt a video recording being made from the incoming image stream (such as with a long exposure image capture); and/or one or more image capture conditions (e.g., ambient light levels, the makeup of a captured image's content, and/or a classification of the type of scene being captured).

According to some embodiments, a set of rules and/or a decision tree may be used to evaluate the one or more capture conditions and determine which two or more images from the incoming image stream are selected for the fusion operation. For example, according to some embodiments, a default set of selected images may comprise: two or more EV0 images, one or more EV− image, and one long exposure image. Based on the evaluated capture conditions, the default set of selected images may be modified, e.g., in terms of the number of images selected, the types of images selected, and/or which type of image is selected as the reference image for the purpose of the fusion operation. In some embodiments, the selected images may comprise at least one image from the incoming image stream captured before the receiving of the capture request. In other embodiments, the selected images may further comprise at least one image from the incoming image stream captured after the receiving of the capture request. In still other embodiments, the selected images may further comprise at least one image pair, wherein the images in the image pair are taken consecutively and, in some instances, with a very small delay between their captures, but with different exposure settings from one another. In some instances, multiple image pairs may be captured sequentially at a predetermined frame rate, as described in more detail below. In other instances, a noise reduction process may also be performed, e.g., on one or more of the selected images prior to the fusion operation, or on the resultant fused image.

Such an approach may combine insights from fusion schemes used with SIS, OIS, and HDR image capture modes into a single, "unified" bracketing scheme, such that the advantages of highlight recovery, motion freezing, and low noise are at least partially maintained throughout a wide variety of capturing conditions. The captured images to be used as candidate images in a given image fusion operation could, e.g., consist of a combination of: EV−, EV0, EV+, and/or long exposure images. Combining these multiple fusion schemes into one unified scheme may yield quality benefits in output images, as well as a reduction in the tuning and validation efforts required to perform image fusion across a wide variety of capturing conditions.

As mentioned above, various non-transitory program storage device embodiments are disclosed herein. Such program storage devices are readable by one or more processors. Instructions may be stored on the program storage devices for causing the one or more processors to: obtain an incoming image stream from one or more image capture devices; obtain one or more capture conditions associated with the capture of the incoming image stream; receive a capture request at the image capture device (e.g., via a user interface); select, in response to the capture request, two or more images from the incoming image stream based, at least in part, on the one or more capture conditions, wherein at least one of the selected images from the incoming image stream comprises an image captured before the receiving of the capture request; register the selected two or more images; fuse the registered two or more images to form a fused image; and store the fused image in a memory.

Various methods of taking an adaptive approach to image bracket selection and fusion are also disclosed herein, in accordance with the program storage device embodiments enumerated above. Various programmable electronic devices are also disclosed herein, in accordance with the program storage device embodiments enumerated above. Such electronic devices may include one or more image capture devices, such as optical image sensors/camera units; a display; a user interface; a programmable control device; and a memory coupled to the programmable control device. Instructions may be stored in the memory, the instructions causing the programmable control device to execute instructions in accordance with the various program storage device embodiments enumerated above.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1A:
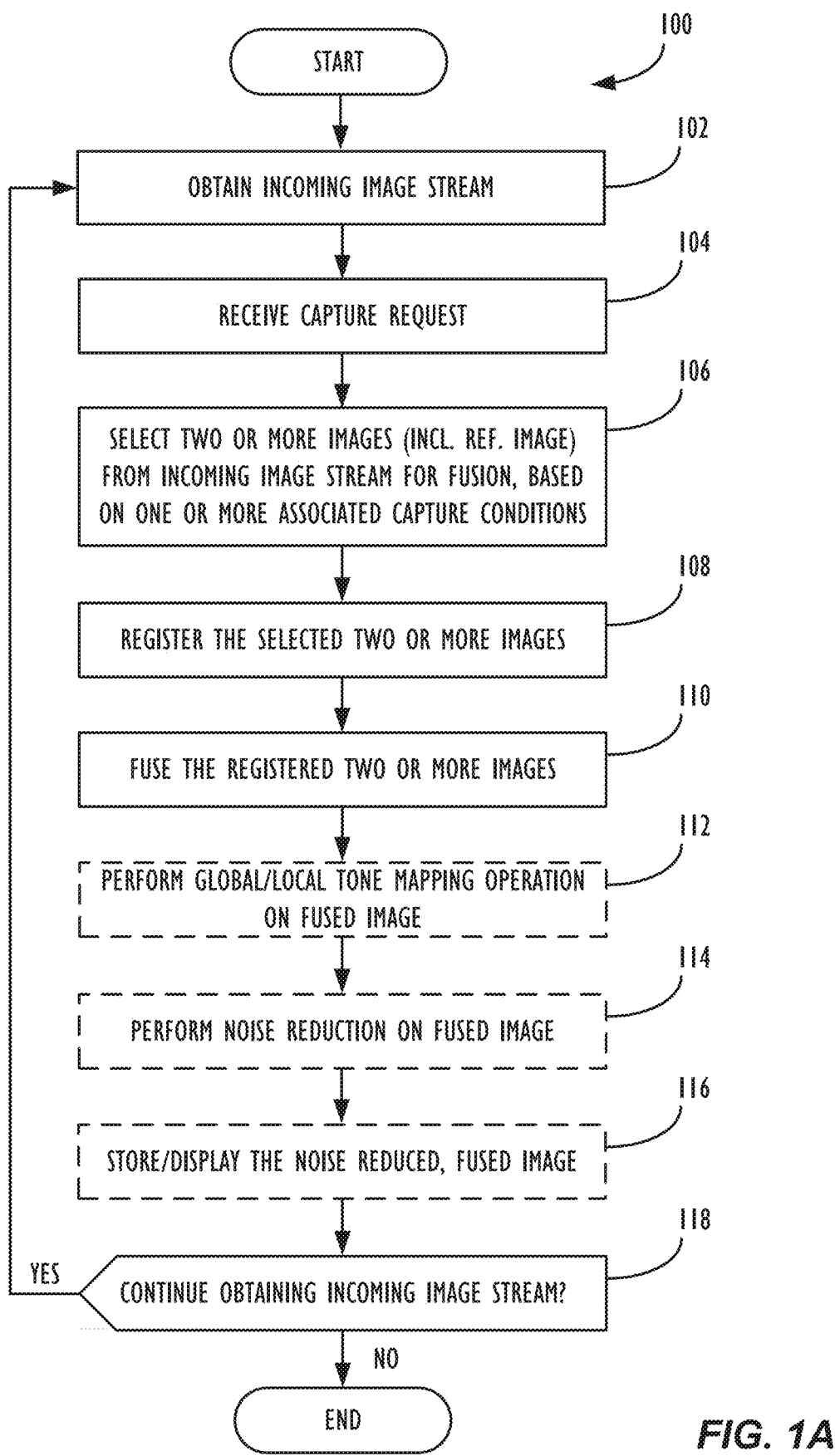
FIG. 1A is flow chart illustrating a method of adaptive image bracket selection and fusion, according to one or more embodiments.

Referring now to FIG. 1A, a flow chart 100 illustrating a method of adaptive image bracket selection and fusion is shown, according to one or more embodiments. First, the process 100 may begin by obtaining an incoming image stream (Step 102), e.g., comprising images captured by one or more cameras or other image capture devices. As will be explained in further detail below, the incoming image stream may comprise two or more differently-exposed images.

According to some embodiments, one or more (up to all) of the images in the incoming image stream may be encoded in a way to preserve low-light details, e.g., tone mapped via a square root encoding. In some embodiments, it may be desirable for the chosen encoding method to be invertible, such that, during fusion, the encoding of the captured image frames may be inverted and areas of ghosting artifacts may be accurately identified. In other words, in order to be able to compare the corresponding pixel values between the reference image and other candidate images to identify potential ghost pixels (i.e., those pixels that are very different from their corresponding reference pixels), the pixel values must first be made comparable to one another by accounting for any differences in encoding. For example, the inversion of a tone mapping curve that applies a square root encoding would be a tone mapping curve that applies a squaring function (i.e., raises the input value to the power of two). While a number of suitable encoding techniques may be used, it may be desirable to select an encoding technique that is relatively quick and reliable to help balance processing time and accuracy during encoding and inversion.

According to some embodiments, the encoding of the images from the incoming image stream may occur directly after each respective image's capture time (or subsequently thereafter, e.g., after any additional desired processing steps are performed on the respective image data). In some instances, the encoding operation may be performed directly by an Image Signal Processor (ISP), e.g., when converting the RAW image data captured from an image sensor into a different color space, e.g., the YUV color space (or other desired color space). In some embodiments, e.g., based on ambient lux levels, one or more captured images may not be encoded and, e.g., may be left in the linear domain, for the fusion operation. In some instances, e.g., square root encoding (or other low-light detail preserving schemes) may not be employed if a captured image is taken in a scene having greater than a threshold lux level, i.e., where there are unlikely to be many low-light details to preserve. In such instances, the particular images would not need to be inverted before being registered and/or fused with the other images selected for the fusion operation, as will be explained in greater detail below.

Discussion will now turn to the nomenclature that will be used herein to refer to the various differently-exposed images from the incoming image stream. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV−, EV0, EV+, and/or long exposure images. It is further noted that the image stream may also comprise a combination of arbitrary exposures, as desired by a given implementation or operating condition, e.g., EV+2, EV+4, EV−3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be "synthesized" from multiple captured images that are fused together (which will be referred to herein as a "synthetic long exposure image"). In instances where the image capture device is capable of performing OIS, the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types of long exposure images, e.g., depending on capture conditions. For example, in some embodiments, a synthetic long exposure image may be created when the image capture device does not or cannot perform OIS, while a single long exposure image may be captured when an OIS system is available and engaged at the image capture device. According to some embodiments, in order to recover a desired amount of shadow detail in the captured image, some degree of overexposure (e.g., EV+2) may intentionally be employed in bright scenes and scenes with medium brightness. Thus, in certain brighter ambient light level conditions, the long exposure image itself may also comprise an image that is overexposed one or more stops with respect to EV0 (e.g., EV+3, EV+2, EV+1, etc.). To keep brightness levels consistent across long exposure images, the gain may be decreased proportionally as the exposure time of the capture is increased, as, according to some embodiments, brightness may be defined as the product of gain and exposure time.

In some embodiments, long exposure images may comprise images captured with greater than a minimum threshold exposure time, e.g., 50 milliseconds (ms) and less than a maximum threshold exposure time, e.g., 250 ms. In other embodiments, long exposure images may comprise images captured with a comparatively longer exposure time than a corresponding normal or "short" exposure image for the image capture device, e.g., an exposure time that is 4 to 30 times longer than a short image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an OIS system during the capture operation.

It is to be noted that the noise level in a given image may be estimated based, at least in part, on the system's gain level (with larger gains leading to larger noise levels). Therefore, in order to have low noise, an image capture system may desire to use small gains. However, as discussed above, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have an OIS systems, the use of very long exposure times will likely result in motion blurred images, which is often undesirable. Thus, as may now be understood, the long exposure image's exposure time may not always be the maximum threshold exposure time allowed by the image capture device.

According to some embodiments, the incoming image stream may comprise a particular sequence and/or particular pattern of exposures. For example, according to some embodiments, the sequence of incoming images may comprise: EV0, EV−, EV0, EV−, and so forth. In other embodiments, the sequence of incoming images may comprise only EV0 images. In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence. The sequence of exposures may, e.g., continue in this fashion until a subsequent capture request is received, the camera(s) stop capturing images (e.g., when the user powers down the device or disables a camera application), and/or one when or more operating conditions may change. In still other embodiments, the image capture device may capture one or more additional EV0 images in response to the received capture request and then fuse the additional EV0 short exposure images (along with, optionally, one or more additional EV0 images captured prior to the received capture request, if so desired) into a synthetic long exposure image, as discussed above, which synthetic long image may then be treated as a single image for the purposes of the image fusion selection processes described herein. According to some embodiments, the images in the incoming image stream may be captured as part of a preview operation of a device, or otherwise be captured while the device's camera(s) are active, so that the camera may more quickly react to a user's capture request. Returning to the sequence of incoming images may ensure that the device's camera(s) are ready for the next capture request.

Returning to process 100, upon receipt of a capture request (Step 104), e.g., in the form of a user selection of a physical shutter capture button or other user interface element indicating the user's desire to capture a still image, the process may select two or more images from the incoming image stream for fusion (Step 106), including which image should serve as the reference image for the fusion operation. The selection of which images from the incoming image stream to include in the image fusion operation may be based on one or more capture conditions associated with the respective images from the incoming image stream. For example, as will be explained in further detail below, each incoming image may be tagged with various metadata, such as: an indication of whether the image was captured in an HDR mode, an indication of whether the image was captured with OIS engaged, an indication of the movement of the device during the image's capture (e.g., translation, rotation, acceleration, velocity, orientation, etc.), an indication of the EV setting of the captured image, an indication of flicker in the captured image, an indication of ambient light conditions during the capture of the image, an indication of the nature of the content of the captured image (e.g., brightness, sharpness, tonality, scene classification, face/smile detection), etc. According to some embodiments, and as will be described in more detail below with reference to FIG. 3, a set of rules and/or a decision tree may be used to evaluate the one or more capture conditions and determine which two or more images from the incoming image stream are selected for the fusion operation.

Next, at Step 108, the selected two or more images may be registered using any desired image registration method, e.g., global registration, local registration, dense optical flow, etc. As mentioned above, one of the selected images may be chosen to serve as the reference image of the registration process, and the other selected images may serve as the candidate images that are to be registered with the reference image. In some embodiments, the reference image may be chosen based on an exposure characteristic (e.g., using an EV− image as the reference image versus using an EV0 image as the reference image). In some embodiments, the reference image may be selected as the image captured closest in time to the capture request received from the user. In other cases, if the image captured closest in time to the capture request is not of a high enough quality (e.g., in terms of sharpness, noise, brightness, face confidence, etc.), then a second closest in time image may be selected as the reference image. In other embodiments, the sharpest image may serve as the reference image. In some such embodiments, the sharpest image may be determined by calculating a sharpness score for each image that is to be considered for the fusion operation. The sharpness score may be based on information in the respective image's metadata, e.g., the image's auto-focus score, the device's positional data during the capture of the respective image, OIS system data, etc. In some embodiments, images with below a threshold sharpness score may simply be excluded from fusion operations. If no image has greater than the threshold sharpness score, the device may determine that it is not possible to perform fusion operations for the given capture request. In other embodiments, the threshold sharpness score may be defined as a score that is more than a maximum sharpness threshold below the sharpness score of the selected reference image.

Once the selected two or more images have been registered, they may be fused using any desired image fusion method (Step 110). According to some embodiments, one or more tone mapping operations, e.g., global and/or local tone mapping operations may be performed on the image subsequently to the fusion operation (Step 112). At Step 114, any desired noise reduction may be applied to the fused image. (It is to be understood that, in some embodiments, the tone mapping and/or noise reduction steps may be optional.) Finally, at Step 116, the resultant fused image may optionally be stored in a memory and/or display on a display device. So long as the image capture device continues to obtain the incoming image stream (i.e., "YES" at Step 118), the process may return to Step 102 and continue operation. Once the image capture device has ceased to obtain the incoming image stream (i.e., "NO" at Step 118), e.g., in response to the user turning off the image capture device or closing the camera application, the process 100 may end. In some embodiments, the same registration/fusion and/or noise reduction techniques may be applied, regardless of which set of two or more images are selected from the incoming image stream. It is to be understood that certain steps illustrated in FIG. 1A may be performed in a different sequence than is illustrated. For example, in some embodiments, noise reduction Step 114 could be performed on each individual selected image before the registration and/or fusion steps 108 and 110, respectively.

Figure 1B:
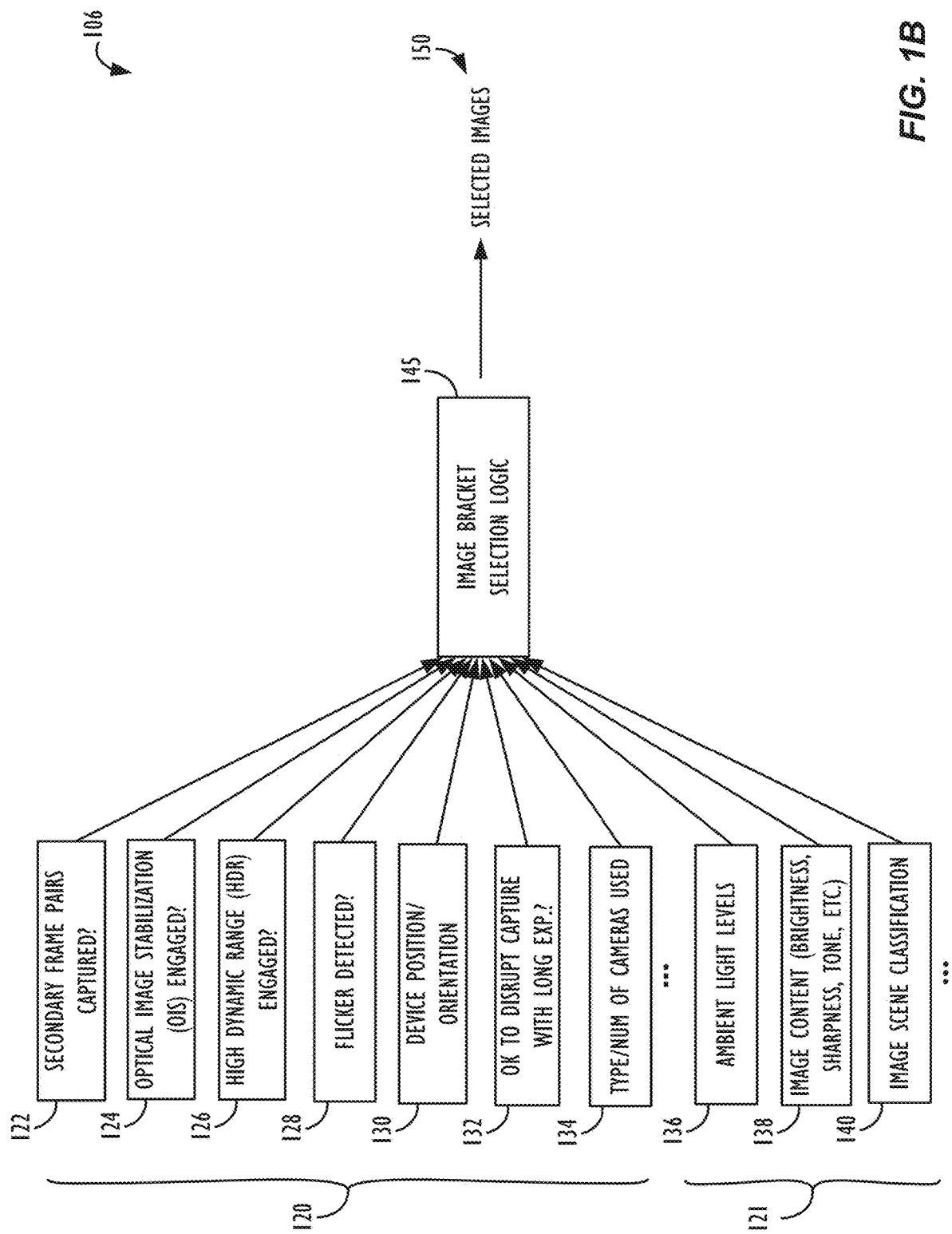
FIG. 1B illustrates various capture conditions that may be considered in an adaptive image bracket selection and fusion method, according to one or more embodiments.

Referring now to FIG. 1B, various capture conditions 122-140 that may be considered in an adaptive image bracket selection and fusion method are shown, according to one or more embodiments. For reference, the various blocks shown in FIG. 1B may be performed as part of Step 106 of FIG. 1A, described above. In particular, the various capture conditions 122-140 may be divided into at least two different categories: device capture conditions 120 and image capture conditions 121.

Device capture conditions 120 may relate to the status and/or operational mode of the image capture device during the capture of the respective image(s). For example, device capture conditions 120 may comprise an indication of: whether the image capture device is capturing secondary frame pairs (SFPs) 122, whether an OIS mode of the image captured device has been properly engaged 124, whether an HDR mode of the image capture device has been engaged 126, whether flicker has been detected in one or more of the incoming captured images 128, positional or orientation data related to the image capture device during the capture of the relevant parts of the incoming image stream 130, whether it is permissible to disrupt the incoming image stream 132, such as with a long exposure image capture, and/or the type or number of image capture devices (e.g., cameras) used to capture the incoming images 134. For example, with regard to element 130, an indication that the image capture device was translating or rotating faster than some threshold movement amount during the capture of a particular image may cause the unified scheme to either not include the particular image, or at least not select the particular image to serve in the role of reference image during the fusion operation. With regard to element 132, in some embodiments, it may not be permissible to interrupt the incoming image stream with a long exposure image capture because, e.g., the image capture device may simultaneously be capturing a video stream at a particular frame rate when the capture request is received, and stopping to capture the long exposure image could cause the video stream to drop its frame rate, which may be undesirable or unacceptable in a given implementation.

Image capture conditions 121 may relate to a property and/or characteristic of a particular respective image captured by the image capture device. For example, image capture conditions 121 may comprise an indication of: ambient light levels around the image capture device during the capture of the respective image 136, the makeup of a captured image's content 138, such as an image histogram, brightness, sharpness, tone curve, noise level, and/or scene classification 140, e.g., a machine learning method can run in the background and analyze/classify incoming images based on a variety of criteria (e.g., smile/blink detection, event type, scene dynamism, etc.).

As mentioned above, the one or more capture conditions are evaluated by the image bracket selection logic 145, an exemplar of which will be described in further detail below with reference to FIG. 3. The image bracket selection logic 145 may thus determine a set of two or more selected images 150 (including, potentially, a designation of which selected image(s) will serve as the reference), which images may be utilized for the rest of the improved image fusion processing pipeline, for example, returning to Step 108 of FIG. 1A.

Figure 2A:
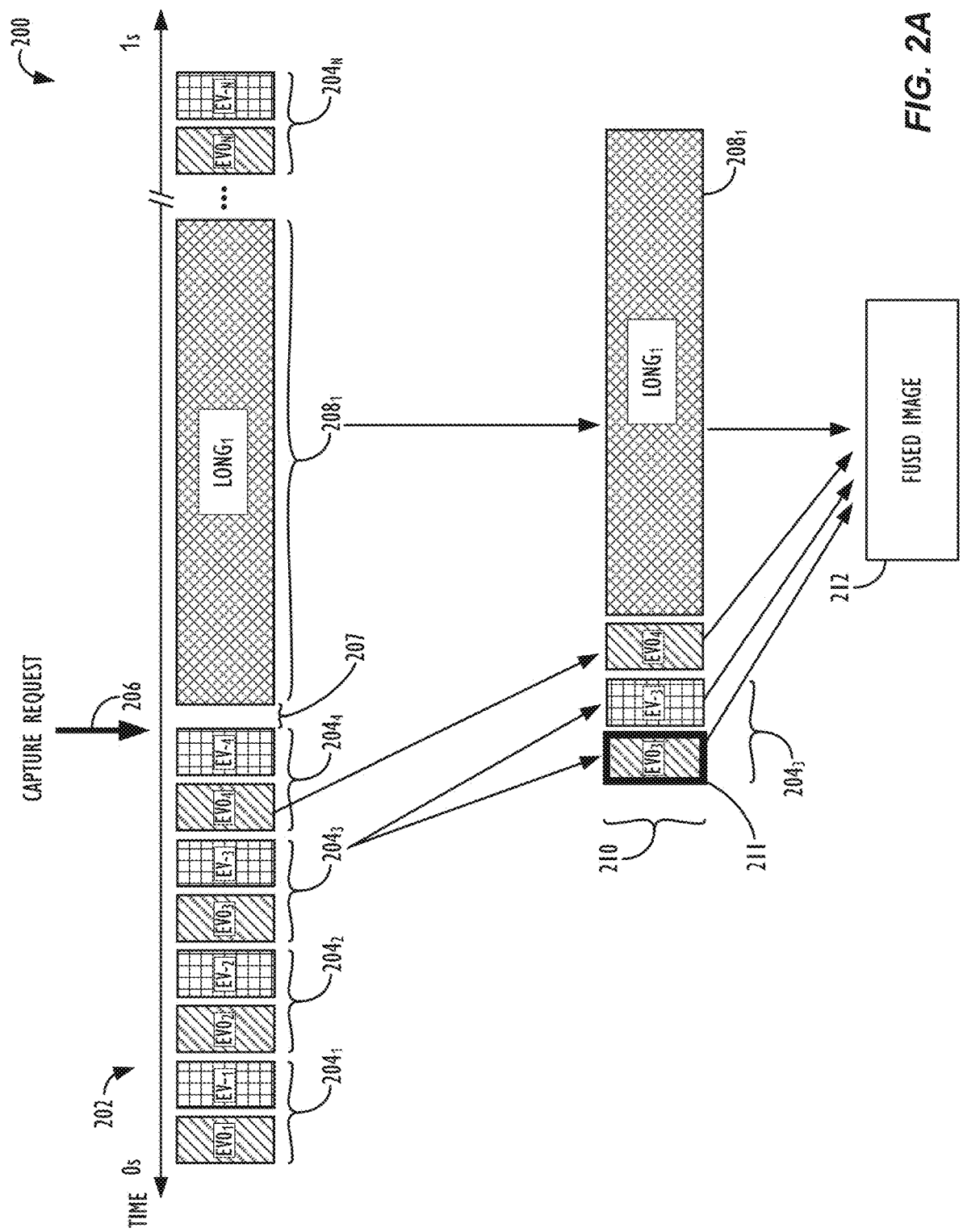
FIG. 2A illustrates an exemplary incoming image stream that may be used in an adaptive image bracket selection and fusion method, according to one or more embodiments.

Referring now to FIG. 2A, an exemplary incoming image stream 200 that may be used in an adaptive image bracket selection and fusion method is shown, according to one or more embodiments. Images from incoming image stream 200 may be captured along a timeline, e.g., exemplary image capture timeline 202, which runs from a starting point labeled 0 seconds, to a point labeled as 1 second. It is to be understood that this timeline is presented merely for illustrative purposes, and that a given incoming image stream could be captured for seconds, minutes, hours, days, etc., based on the capabilities and/or needs of a given implementation.

According to some embodiments, EV0 image frames in the incoming image stream may, by default, be captured according to a first frame rate, e.g., 15 frames per second (fps), 30 fps, 60 fps, etc. In some embodiments, this frame rate may remain constant and uninterrupted, unless (or until) a capture request 206 is received at the image capture device. In other embodiments, the frame rate of capture of EV0 image frames may vary over time, based on, e.g., one or more device conditions, such as device operational mode, available processing resources, ambient lighting conditions, thermal conditions of the device, etc.

In other embodiments, one or more captured EV0 images may be paired with another image as part of an aforementioned SFP. The SFP, according to some embodiments, may comprise an image that is captured and read out from the image sensor consecutively, e.g., immediately following, the capture of the corresponding EV0 image. In some embodiments, the SFP may comprise an EV0 image and: an EV−1 image frame, an EV−2 image frame, or an EV−3 image frame, etc. EV− images will have a lower exposure time and thus be somewhat darker and have more noise than their EV0 counterpart images, but they may do a better job of freezing motion and/or representing detail in the darker regions of images.

In the example shown in FIG. 2A, SFPs 204 are captured sequentially by the image capture device (e.g., $204_1$, $204_2$, $204_3$, $204_4$, and so forth), with each SFP including two images with differing exposure values, e.g., an EV0 image and a corresponding EV− image. Note that the EV0 and EV− images illustrated in FIG. 2A use a subscript notation (e.g., $EV-_1$, $EV-_2$, $EV-_3$, $EV-_4$, and so forth). This subscript is simply meant to denote different instances of images being captured (and not different numbers of exposure stops). It is to be understood that, although illustrated as pairs of EV0 and EV− images in the example of FIG. 2A, any desired pair of exposure levels could be utilized for the images in an SFP, e.g., an EV0 image and an EV−2 image, or an EV0 image and in EV−3 image, etc. In other embodiments, the SFP may even comprise more than two images (e.g., three or four images), based on the capabilities of the image capture device.

In some embodiments, the relative exposure settings of the image capture device during the capture of the images comprising each SFP may be driven by the image capture device's AE mechanism. Thus, in some instances, the exposure settings used for each SFP may be determined independently of the other captured SFPs. In some instances, the AE mechanism may have a built in delay or lag in its reaction to changes in ambient lighting conditions, such that the AE settings of the camera do not change too rapidly, thereby causing undesirable flickering or brightness changes. Thus, the exposure settings for a given captured image (e.g., EV0 image, EV− image, and/or EV+ image) may be based on the camera's current AE settings. Due to the consecutive nature of the readouts of the images in an SFP, it is likely that each image in the SFP will be driven by the same AE settings (i.e., will be captured relative to the same calculated EV0 settings for the current lighting conditions). However, if the delay between captured images in an SFP is long enough and/or if the camera's AE mechanism reacts to ambient lighting changes quickly enough, in some instances, it may be possible for the images in a given SFP to be driven by different AE settings (i.e., the first image in the SFP may be captured relative to a first calculated EV0 setting, and the second image in the SFP may be captured relative to a second calculated EV0 setting). Of course, outside of the context of SFPs, it may also be possible for consecutive captured images, e.g., from an incoming image stream, to be captured relative to different calculated EV0 settings, again based, e.g., on changing ambient lighting conditions and the rate at which the camera's AE mechanism updates its calculated EV0 settings.

According to some embodiments, the capture frame rate of the incoming image stream may change based on the ambient light levels (e.g., capturing at 30 fps in bright light conditions and at 15 fps in low light conditions). In one example, assuming that the image sensor is streaming captured images at a rate of 30 fps, the consecutive SFP image pairs (e.g., EV0, EV−) are also captured at 30 fps. The time interval between any two such SFP captures would be $\frac{1}{30}^{th}$ of a second, and such interval may be split between the capturing of the two images in the SFP, e.g., the EV0 and EV− images. According to some embodiments, the first part of the interval may be used to capture the EV0 image of the pair, and last part of the interval may be used to capture the EV− image of the pair. Of course, in this 30 fps example, the sum of the exposure times of the EV0 and EV− images in a given pair cannot exceed $\frac{1}{30}^{th}$ of a second.

Moving forward along timeline 202 to the capture request 206, according to some embodiments, a long exposure image $208_1$ may be captured by the image capture device in response to the receipt of the capture request 206. According to some embodiments, an additional delay 207 may be built in to the image capture stream following the receipt of an capture request 206, e.g., so that any shaking or vibrations caused by a user's touching or selection of a capture button on the image capture device (e.g., either a physical button or software-based user interface button or other graphical element) may be diminished before the initiation of the long exposure image capture, which, although more likely to produce a low-noise image, is potentially more prone to blurring, and thus lack of sharpness, due to the amount of time the shutter stays open during the capture of the long exposure image.

As described above, based on the evaluation of one or more capture conditions, the image capture device may then select two or more images 210 for inclusion in the image fusion operation. In the example of FIG. 2A, the images: $EV0_3$, $EV-_3$, $EV0_4$, and $LONG_1$ have been selected for inclusion in the fusion operation, and, in particular, one of images $EV0_3$ or $EV-_3$ (from secondary frame pair $204_3$) may be selected to serve as the final reference image. According to some embodiments, as an initial step, one or more of the SFPs may be identified as "candidate reference image pairs," i.e., an image pair from which the final reference image for the fusion operation may be taken. In some embodiments, the candidate reference image pairs may comprise a predetermined number of SFPs captured prior to (and/or after) a received capture request. For example, in some embodiments, the candidate reference image pairs may comprise the four SFPs captured prior to the capture request. Next, a particular candidate reference image pair may be selected as the "selected reference image pair." For example, the selected reference image pair may be selected based, at least in part, on a comparison of the sharpness scores of the pair's respective EV0 image to sharpness scores of the respective EV0 images of the other candidate reference image pairs. For example, the selected reference image pair may be the SFP having the sharpest EV0 image. In other embodiments, the determination of the selected reference image pair may be based on one or more timing measures or image/device capture conditions. As mentioned above, in the example illustrated in FIG. 2A, secondary frame pair $204_3$ has been selected as the selected reference image pair, due, e.g., to the fact that $EV0_3$ may be the sharpest EV0 image from among the EV0 images being considered for the fusion operation (or whatever image aspect or combination of aspects the reference image selection decision may be based on for a given implementation).

According to such embodiments, from the selected reference image pair (e.g., comprising one EV0 image and one EV− image), the process may select one image to serve as the final reference image 211, e.g., either the EV0 image or the EV− image from the selected reference image pair. The determination of which image from the selected reference image pair to select to serve as the final reference image for the fusion operation may be based on a number of factors. For example, the determination may be based on various image aspects, such as: noise level, sharpness, and/or the presence (or prevalence) of ghosting artifacts. For example, in order to ensure lower noise, the EV0 image may be selected as the final reference image, especially in lower ambient light level conditions. On the other hand, e.g., in dynamic scenes with moving objects and/or people, the EV− image may be preferred as the final reference image because it ensures a shorter exposure time and hence less motion blurring than the corresponding EV0 image from the selected reference image pair. In the example illustrated in FIG. 2A, $EV0_3$ has been selected to serve as the final reference image 211 for the fusion operation (as indicated by the thicker border line on $EV0_3$). Once a final reference image is selected, each of the other selected images 210, e.g., including $EV-_3$, $EV0_4$ and long exposure image $208_1$ in the example illustrated in FIG. 2A, may be registered with respect to the final reference image 211.

The fusion operation of the selected images will result in fused image 212. As will be explained below with reference to FIG. 3, the decision of which images to include in the fusion operation may be based on a set of predetermined rules and/or decision tree that may be used to translate various capture conditions into the sets of images that will be selected for the image fusion operation. As also illustrated in the example of FIG. 2A, after the capture of the long exposure image, the image capture stream may go back to capturing SFPs $204_N$, EV0 images, or whatever other pattern of images is desired by a given implementation, e.g., until the next capture request is received, thereby triggering the capture of another long exposure image, or until the device's camera functionality is deactivated.

Figure 2B:
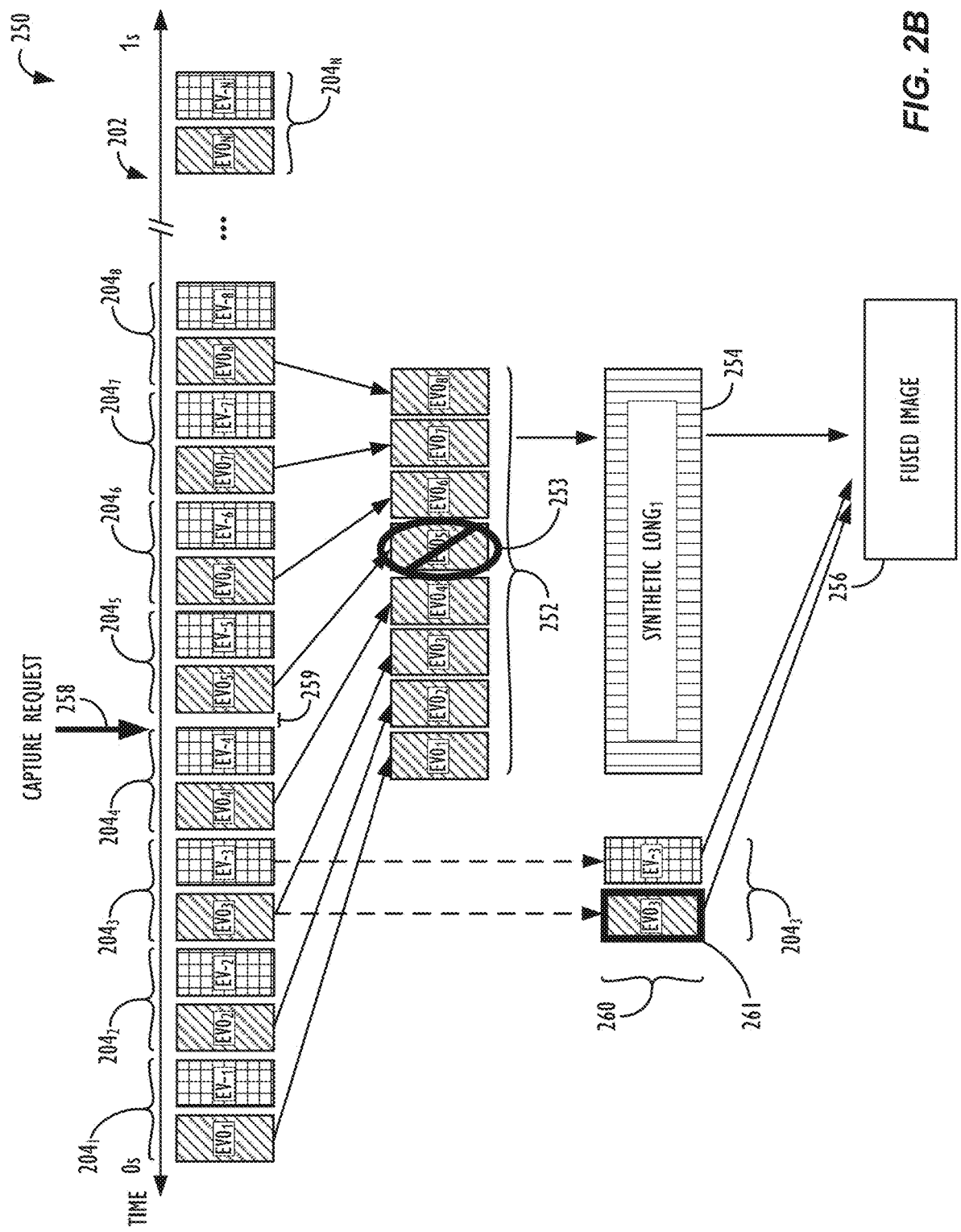
FIG. 2B illustrates another exemplary incoming image stream that may be used in an adaptive image bracket selection and fusion method, according to one or more embodiments.

Referring now to FIG. 2B, another exemplary incoming image stream 250 that may be used in an adaptive image bracket selection and fusion method is shown, according to one or more embodiments. In contrast with FIG. 2A, in the incoming image stream 250 shown in FIG. 2B, the image capture device does not capture a single long exposure image having a comparatively longer exposure time than the EV0 and EV− images in response to the capture request. Rather, the image capture device may take a series of two or more additional short exposure images (e.g., as shown by secondary frame pairs $204_5$-$204_8$ in FIG. 2B). In the example of FIG. 2B, a set of images 252, e.g., four short exposure EV0 images captured after the capture request ($204_5$-$204_8$) and four short exposure EV0 images captured prior to the capture request ($204_1$-$204_4$), are selected and fused together (e.g., via an averaging algorithm) into a synthetic long exposure image (SYNTHETIC $LONG_1$ 254). In other embodiments, a different number of short exposure images may be fused together to form the synthetic long exposure image, as is desired for a given implementation. For example, in a given embodiment, only the EV0 images captured prior to the capture request may be used, only the EV0 images captured after the capture request may be used, or a desired combination of EV0 images captured both prior to and after the capture request may be used. In still other embodiments, one or more EV− images captured prior to and/or after the capture request may also be used to form the synthetic long exposure image. For example, in one embodiment, a synthetic long exposure image may be formed by combining various selected EV0 and EV− images, e.g., via a weighted combination, where highlight regions are taken from the various EV− images, and the remaining parts of the scene are taken from the various EV0 images. In still other embodiments, an additional blurred frame elimination process may be executed on the set of images 252 selected for fusion into the synthetic long exposure image. For example, any EV0 frames that have greater than a threshold amount of blur, e.g., wherein the permissible threshold amount of blur may be based on a comparison to the amount of blur in the selected reference image (i.e., $EV0_3$ in the case of FIG. 2B), may be discarded from use in the creation of the synthetic long exposure image. For example, as is illustrated in FIG. 2B, image $EV0_5$ 253 has been determined to have more than the maximum threshold amount of blur for the current capture operation, and thus has been discarded from use in the creation of the synthetic long exposure image. This greater relative amount blurring may be due, e.g., to the proximity in time of $EV0_5$'s capture to the receiving of capture request 258, which capture request can cause additional movement or shaking of the image capture device in immediately subsequently captured images, e.g., due to a user interacting with a display screen (e.g., touch input) or otherwise interacting with a user interface element (e.g., a button) of the device in order to indicate the capture request.

In some cases, a synthetic long exposure image may be desirable because a given implementation may not want to capture a long exposure image in response to a capture request, as it may disrupt a video stream that is concurrently being captured by the image capture device when the image capture request is received. In some instances, when a synthetic long exposure image is captured (e.g., as opposed to a long exposure image, as in FIG. 2A), the delay 259 time interval may be shortened (i.e., as compared to the case when a long exposure image is captured in response to the capture request)—or done away with altogether—as the multiple short exposure images 252 used to generate the synthetic long exposure image may be less susceptible to blurriness caused by any residual device motion from a user's interaction with the image capture device (e.g., touch input) to indicate the capture request than would a typical long exposure image. However, some scenes may be so dark that the use of a synthetic long exposure image would not be desirable, e.g., due to the increased noise that would result in the constituent short exposure images used to create the synthetic long exposure image.

Once the synthetic long exposure image 254 has been created, it may be fused with the other selected images from the incoming image stream (e.g., images 260, including secondary frame pair $204_3$ comprising reference image $EV0_3$ 261 and $EV-_3$, as well as synthetic long exposure image 254, in the example illustrated in FIG. 2B), in order to form the resultant fused image 256.

Figure 3:
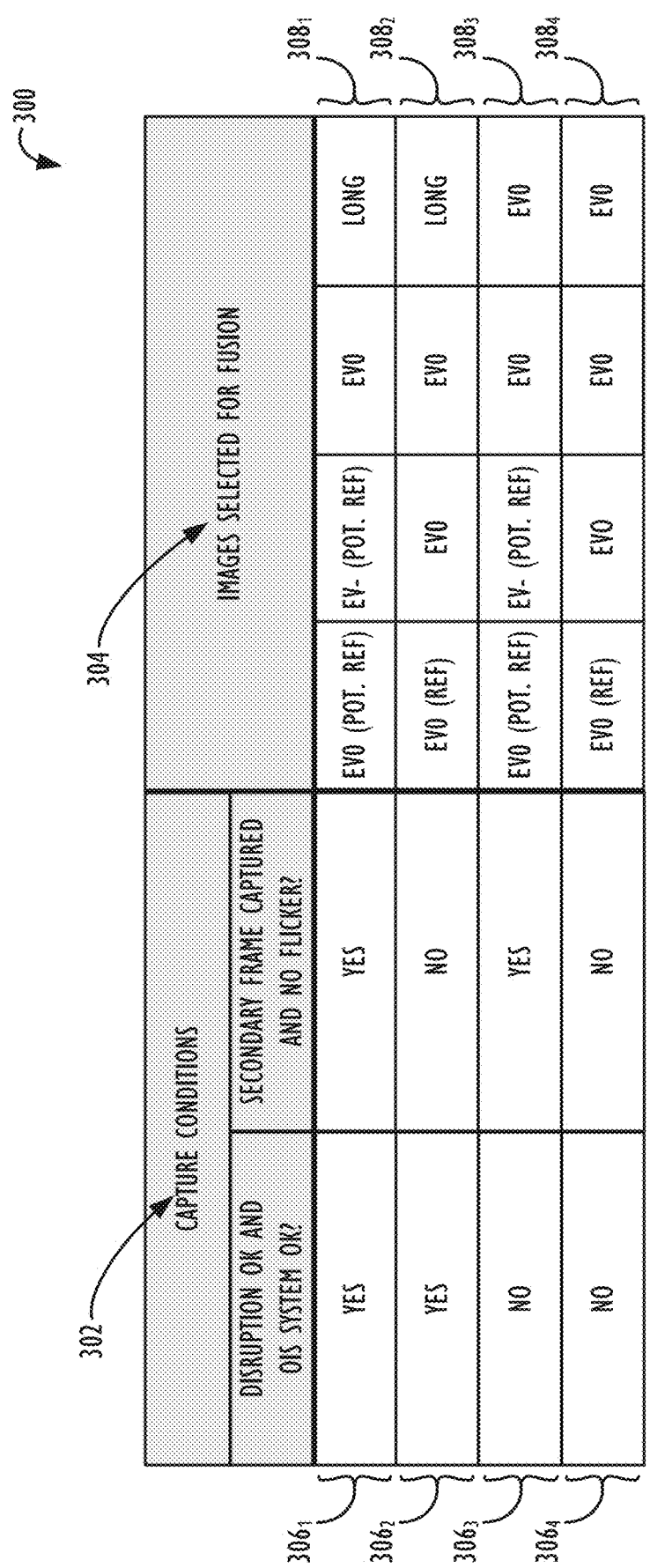
FIG. 3 is an example of a set of rules relating image capture conditions to sets of images that may be selected for inclusion in an adaptive image bracket selection and fusion method, according to one or more embodiments.

Referring now to FIG. 3, an example of a set of rules 300 relating image capture conditions 302 to sets of images 304 that may be selected for inclusion in an adaptive image bracket selection and fusion method is shown, according to one or more embodiments. In this example, the capture conditions 302 considered include: whether it is permissible to disrupt the incoming image stream, e.g., with a long exposure image capture; whether an OIS mode of the image capture device was engaged during the capture of the images being considered for inclusion in the fusion operation; whether one or more SFPs have been captured; and whether flicker has been detected in one or more of the images from the incoming image stream being considered for inclusion in the fusion operation. In this particular example, the first two capture conditions are linked with an 'and,' meaning that a "YES" in the first column of table 300 signifies that both disruption of the incoming image stream is OK and the OIS system was engaged. If either condition is not met, the first column of table 300 will be evaluated as "NO." Likewise, in this particular example, the second two capture conditions are also linked with an 'and,' meaning that a "YES" in the second column of table 300 signifies that both secondary frame pairs have been captured and there is no flicker detected. If either condition is not met, the second column of table 300 will be evaluated as "NO." In other embodiments, capture conditions do not necessarily need to be linked, meaning that, e.g., with four independent Boolean capture conditions, there could be a potential 16 (i.e., 2^4) unique sets of images 304 that could be selected for fusion.

In row 1 of the capture conditions sub-table $306_1$, the relevant capture conditions 302 indicate that: disruption is OK and the OIS system was performing properly, and that it was the case that secondary frame pairs were acquired and no flicker indicated. In response to these evaluated conditions, the exemplary set of rules 300 will determine that the images to be selected for fusion include: an EV0 potential reference image, an EV− potential reference image, an EV0 image, and a long exposure image (as shown in row $308_1$ of the selected images sub-table). As explained above, according to some embodiments, after an initial determination of the selected reference image pair has been made, the process may select one image from the selected reference image pair to serve as the final reference image, e.g., either the EV0 image or the EV− image from the selected reference image pair. The determination of which potential reference image from the selected reference image pair to select to serve as the final reference image for the fusion operation may be based on any number of factors (e.g., sharpness, noise level, etc.), as is desired for a given implementation.

In row 2 of the capture conditions sub-table $306_2$, the relevant capture conditions indicate that: disruption is OK and the OIS system was performing properly, but that it was not the case that secondary frame pairs were acquired and no flicker indicated. In response to these evaluated conditions, the exemplary set of rules 300 will determine that the images to be selected for fusion include: an EV0 reference image, two additional EV0 images, and a long exposure image (as shown in row $308_2$ of the selected images sub-table).

In row 3 of the capture conditions sub-table $306_3$, the relevant capture conditions indicate that: it was not the case that disruption was OK and the OIS system was engaged, but that it was the case that secondary frame pairs were acquired and there was no flicker indicated. In response to these evaluated conditions, the exemplary set of rules 300 will determine that the images to be selected for fusion include: an EV0 potential reference image, an EV– potential reference image, an EV0 image, and a long exposure image (as shown in row $308_3$ of the selected images sub-table). Again, the determination of which potential reference image from the selected reference image pair to select to serve as the final reference image for the fusion operation may be based on any number of factors, as is desired for a given implementation. Notably, in the example of row 3, because it was the case that either the OIS system was not engaged (or was not present in the image capture device) or that disruption of the incoming image stream was not allowed, rather than capture a long exposure image, the image capture device may instead capture an additional one or more EV0 images (or EV0/EV– image pairs), one of which may be selected for inclusion in the fusion operation (as shown in the right-most column of table 300 in row $308_3$).

Finally, in row 4 of the capture conditions sub-table $306_4$, the relevant capture conditions indicate that: it was not the case that disruption was OK and the OIS system was engaged, and that it was also not the case that secondary frame pairs were acquired and that there was no flicker indicated. In response to these evaluated conditions, the exemplary set of rules 300 will determine that the images to be selected for fusion include: an EV0 reference image, and three additional EV0 images (as shown in row $308_4$ of the selected images sub-table). As in the example of row 3, because the OIS system was not engaged (or was not present in the image capture device) or that disruption of the incoming image stream was not allowed, rather than capture a long exposure image, the image capture device may capture an additional one or more EV0 images (or EV0/EV– image pairs), one of which may be selected for inclusion in the fusion operation (as shown in the right-most column of table 300 in row $308_4$).

As may be understood, in other examples, greater or less than four different captured conditions may be evaluated, including more (or different) device capture conditions and/or one or more image capture conditions may also be considered by the image bracket selection logic. In some instances, each condition may vary independently and have an independent effect on the outcome of the set of the selected images. As may also be understood, in other examples, greater or less than four different images may be selected for inclusion in the image fusion operation, including more (or different) types of images than those shown in FIG. 3 and/or one (or more) images that is are formed via the fusion of one or more other images, e.g., as in the case of a synthetic long exposure image (which may be used in place of a long exposure image in certain schemes and/or under certain capture conditions, e.g., as discussed above with reference to FIG. 2B).

Further, it is to be understood that one or more of the various capture conditions 302 described above with reference to FIG. 3 may be determined according to the evaluation of one or more relevant criteria. For example, with regard to the determination of whether flicker has been detected in one or more of the images from the incoming image stream, one or more characteristics indicative of flicker may be evaluated for a given image from the incoming image stream and, if a sufficient (e.g., predetermined) number of the one or more characteristics indicative of flicker meet or exceed one or more respective flicker criteria, then the image may be designated as having flicker for the sake of the evaluation of the capture conditions 302. Likewise, with respect to the determination of whether the OIS system was performing properly (e.g., in instances when an OIS system is not simply turned off or not present on the image capture device), one or more criteria may be applied to make the determination. For example, one or more characteristics indicative of a properly performing OIS system may be evaluated for a given image from the incoming image stream and, if a sufficient (e.g., predetermined) number of the one or more characteristics indicative of proper OIS system performance meet or exceed one or more respective OIS performance criteria, then the image may be designated as having been taken with a properly performing OIS system for the sake of the evaluation of the capture conditions 302. Different image capture devices may employ different criteria in their evaluation of the capture conditions 302, e.g., based on the needs of a given implementation and/or the capabilities of a given image capture device.

Figure 4:
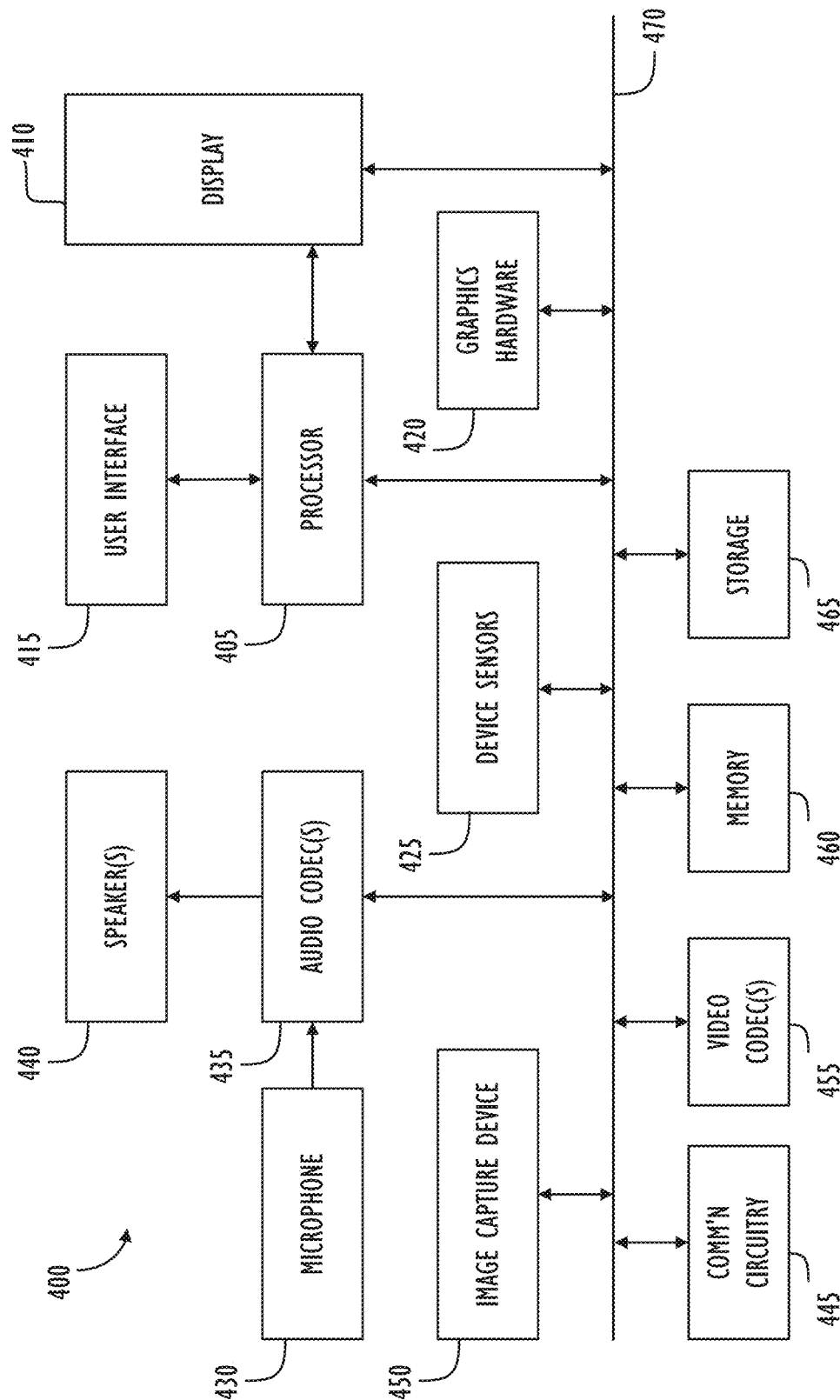
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., SIS, HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate fused versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices;
a display;
a user interface; and
one or more processors operatively coupled to the memory, wherein the one or more processors are configured to execute instructions causing the one or more processors to:
obtain an incoming image stream from the one or more image capture devices, wherein the incoming image stream comprises a plurality of candidate reference image pairs, and wherein each candidate reference image pair of the plurality of candidate reference image pairs comprises:
two images captured consecutively and with different exposure values;
obtain one or more capture conditions associated with the capture of the incoming image stream;
receive a capture request via the user interface;
select, in response to the capture request, two or more images from the incoming image stream based, at least in part, on the one or more capture conditions, wherein at least one of the selected images from the incoming image stream comprises a reference image for registration of the selected two or more images, and wherein the reference image is selected as one of the images from the plurality of candidate reference image pairs;
register the selected two or more images based on the selected reference image; fuse the registered two or more images to form a fused image; and
store the fused image in the memory.

2. The device of claim 1, wherein at least one of the selected images from the incoming image stream comprises an image captured after the receiving of the capture request.

3. The device of claim 2, wherein the image captured after the receiving of the capture request comprises a long exposure image.

4. The device of claim 1, wherein at least one of the selected images from the incoming image stream comprises an image captured before the receiving of the capture request.

5. The device of claim 1, wherein a first image of the two images of each candidate reference image pair comprises an EV0 image, and wherein a second image of the two images of each candidate reference image pair comprises an EV− image.

6. The device of claim 1, wherein the selection of the reference image from among the plurality of candidate reference image pairs is further based, at least in part, on: a comparison of a sharpness scores of the images comprising the plurality of candidate reference image pairs.

7. The device of claim 1, wherein the selection of the reference image from among the plurality of candidate reference image pairs is further based, at least in part, on: a comparison of a timing measures of the images comprising the plurality of candidate reference image pairs.

8. A non-transitory computer readable medium comprising instructions stored thereon to cause one or more processors to: obtain an incoming image stream from one or more image capture devices; obtain one or more capture conditions associated with the capture of the incoming image stream, wherein the incoming image stream comprises a plurality of candidate reference image pairs, and wherein each candidate reference image pair of the plurality of candidate reference image pairs comprises: two images captured consecutively and with different exposure values; receive a capture request from at least one of the one or more image capture devices; select, in response to the capture request, two or more images from the incoming image stream based, at least in part, on the one or more capture conditions, wherein at least one of the selected images from the incoming image stream comprises a reference image for registration of the selected two or more images, and wherein the reference image is selected as one of the images from the plurality of candidate reference image pairs; register the selected two or more images based on the selected reference image; fuse the registered two or more images to form a fused image; and store the fused image in a memory.

9. The non-transitory computer readable medium of claim 8, wherein at least one of the selected images from the incoming image stream comprises an image captured after the receiving of the capture request.

10. The non-transitory computer readable medium of claim 9, wherein the image captured after the receiving of the capture request comprises a long exposure image.

11. The non-transitory computer readable medium of claim 8, wherein at least one of the selected images from the incoming image stream comprises an image captured before the receiving of the capture request.

12. The non-transitory computer readable medium of claim 8, wherein a first image of the two images of each candidate reference image pair comprises an EV0 image, and wherein a second image of the two images of each candidate reference image pair comprises an EV− image.

13. The non-transitory computer readable medium of claim 8, wherein the selection of the reference image from among the plurality of candidate reference image pairs is further based, at least in part, on: a comparison of a sharpness scores of the images comprising the plurality of candidate reference image pairs.

14. The non-transitory computer readable medium of claim 8, wherein the selection of the reference image from among the plurality of candidate reference image pairs is further based, at least in part, on: a comparison of a timing measures of the images comprising the plurality of candidate reference image pairs.

15. A method, comprising:
obtaining an incoming image stream from one or more image capture devices;
obtaining one or more capture conditions associated with the capture of the incoming image stream, wherein the incoming image stream comprises a plurality of candidate reference image pairs, and wherein each candidate reference image pair of the plurality of candidate reference image pairs comprises: two images captured consecutively and with different exposure values;
receiving a capture request from at least one of the one or more image capture devices;
selecting, in response to the capture request, two or more images from the incoming image stream based, at least in part, on the one or more capture conditions, wherein at least one of the selected images from the incoming image stream comprises a reference image for registration of the selected two or more images, and wherein the reference image is selected as one of the images from the plurality of candidate reference image pairs;
registering the selected two or more images based on the selected reference image;
fusing the registered two or more images to form a fused image; and
storing the fused image in a memory.

16. The method of claim 15, wherein at least one of the selected images from the incoming image stream comprises an image captured after the receiving of the capture request.

17. The method of claim 15, wherein at least one of the selected images from the incoming image stream comprises an image captured before the receiving of the capture request.

18. The method of claim 15, wherein a first image of the two images of each candidate reference image pair comprises an EV0 image, and wherein a second image of the two images of each candidate reference image pair comprises an EV− image.

19. The method of claim 15, wherein the selection of the reference image from among the plurality of candidate reference image pairs is further based, at least in part, on: a comparison of a sharpness scores of the images comprising the plurality of candidate reference image pairs.

20. The method of claim 15, wherein the selection of the reference image from among the plurality of candidate reference image pairs is further based, at least in part, on: a comparison of a timing measures of the images comprising the plurality of candidate reference image pairs.

* * * * *

UNITED STATES PATENT AND TRADEMARK OFFICE
CERTIFICATE OF CORRECTION

| | |
|---|---|
| PATENT NO. | : 11,562,470 B2 |
| APPLICATION NO. | : 17/224830 |
| DATED | : January 24, 2023 |
| INVENTOR(S) | : Marius Tico et al. |

It is certified that error appears in the above-identified patent and that said Letters Patent is hereby corrected as shown below:

On the Title Page

Item (73): replace "Apple Inc" with --Apple Inc.--

Signed and Sealed this
Eighteenth Day of April, 2023

Katherine Kelly Vidal
*Director of the United States Patent and Trademark Office*